H. A. MEARS.
Flour-Sifters.
No. 152,239.            Patented June 23, 1874.
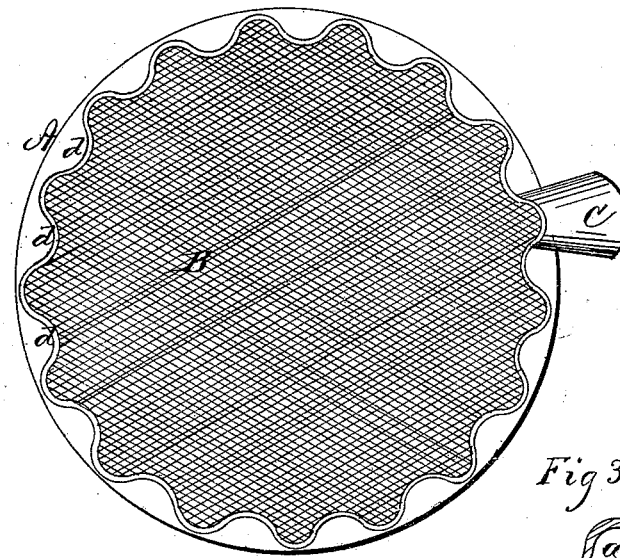
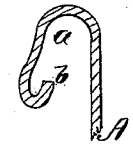
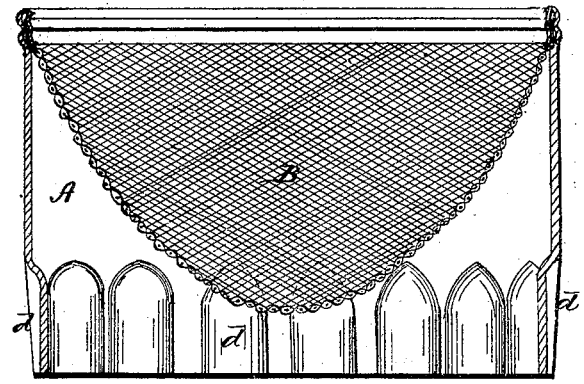
WITNESSES.            INVENTOR.

UNITED STATES PATENT OFFICE.

HORACE A. MEARS, OF ROCKFORD, ILLINOIS.

IMPROVEMENT IN FLOUR-SIFTERS.

Specification forming part of Letters Patent No. 152,239, dated June 23, 1874; application filed April 25, 1874.

*To all whom it may concern:*

Be it known that I, HORACE A. MEARS, of Rockford, in the county of Winnebago and in the State of Illinois, have invented certain new and useful Improvements in Sifters; and do hereby declare that the following is a full, clear, and exact description thereof, reference being had to the accompanying drawings, and to the letters of reference marked thereon, making a part of this specification.

The nature of my invention consists in the construction and arrangement of a flour-sifter, as will be hereinafter more fully set forth.

In order to enable others skilled in the art to which my invention appertains to make and use the same, I will now proceed to describe its construction and operation, referring to the annexed drawing, in which—

Figure 1 is a bottom view of my sifter. Fig. 2 is a longitudinal vertical section of the same, and Fig. 3 is a section of the rim of the sifter.

A represents the rim of my sifter made of a strip of sheet metal of suitable length and width. The upper edge of this metal strip or piece is bent over inward and downward, as shown at $a$, and the extreme edge then bent upward, as shown at $b$, between the body of the rim and the part $a$. The strip or piece A is then bent in circular form, and a piece of wire-cloth, B, which forms a semi-spherical bowl, has its edge inserted between the body of the rim and the part $a$, the edge of the wire-cloth being bent downward into the part $b$. The bent edge of the rim A is then pressed together, and spun or pressed in any suitable manner to form a strong bead around the upper edge of the rim, the ends of said rim being soldered or otherwise fastened together.

In and around the lower part of the rim are made a series of vertical corrugations, $d\ d$, which answer a twofold purpose. They make the rim stiffer and stronger than they otherwise would be, and the lower part of the rim becomes thereby contracted without interfering with the sifting. The wire-cloth bowl B does not extend down to the lower edge of the rim A, but is elevated above the same a short distance, so that when the sifter is placed on a table or other place, the wire-cloth will not touch the same. C represents a short socket attached to the outside of the rim A, for the reception of the handle; or the handle may be secured directly to the sifter.

Having thus fully described my invention, what I claim as new, and desire to secure by Letters Patent, is—

The rim A, having its upper edge bent at $a\ b$, and at its lower part provided with the corrugations $d\ d$, in combination with the wire-cloth bowl B, fastened in the bends $a\ b$ around the upper edge of the rim, all substantially as and for the purposes herein set forth.

In testimony that I claim the foregoing I have hereunto set my hand this 11th day of November, 1873.

HORACE A. MEARS.

Witnesses:
J. G. MANLOVE,
EDWIN DAY.